(12) United States Patent
Tamada et al.

(10) Patent No.: US 7,942,586 B2
(45) Date of Patent: May 17, 2011

(54) THRUST NEEDLE BEARING

(75) Inventors: Kenji Tamada, Kuwana (JP); Hideyuki Tsutsui, Kuwana (JP)

(73) Assignee: NTN Corporation, Osaka (JP)

( * ) Notice: Subject to any disclaimer, the term of this patent is extended or adjusted under 35 U.S.C. 154(b) by 358 days.

(21) Appl. No.: 10/590,010

(22) PCT Filed: Nov. 19, 2004

(86) PCT No.: PCT/JP2004/017234
§ 371 (c)(1), (2), (4) Date: Aug. 21, 2006

(87) PCT Pub. No.: WO2005/080812
PCT Pub. Date: Sep. 1, 2005

(65) Prior Publication Data
US 2007/0189653 A1    Aug. 16, 2007

(30) Foreign Application Priority Data

Feb. 25, 2004  (JP) .................................. 2004-049257
Feb. 25, 2004  (JP) .................................. 2004-049258

(51) Int. Cl.
F16C 19/30  (2006.01)
F16C 33/46  (2006.01)
F16C 33/58  (2006.01)
F16C 32/00  (2006.01)
F16C 41/04  (2006.01)

(52) U.S. Cl. .......................... 384/621; 384/448; 384/618
(58) Field of Classification Search .................. 384/618, 384/621, 622, 623, 448, 569
See application file for complete search history.

(56) References Cited

U.S. PATENT DOCUMENTS

| 3,163,478 | A | * | 12/1964 | Pitner | 384/623 |
| 3,240,542 | A | * | 3/1966 | Jahn | 384/623 |
| 5,456,538 | A | * | 10/1995 | Honda et al. | 384/569 |
| 5,630,668 | A | * | 5/1997 | Ikezawa et al. | 384/527 |
| 5,826,988 | A | | 10/1998 | Furukawa et al. | |
| 6,106,158 | A | * | 8/2000 | Hayashi et al. | 384/623 |
| 2003/0198420 | A1 | | 10/2003 | Matsuyama et al. | |
| 2005/0238275 | A1 | | 10/2005 | Yoshiba | |

FOREIGN PATENT DOCUMENTS

| EP | 0 342 611 A2 | 11/1989 |
| EP | 1 344 953 A2 | 9/2003 |
| EP | 1 589 241 A | 10/2005 |

(Continued)

OTHER PUBLICATIONS

European Search Report issued in European Patent Application No. EP 04821690.7-1252/1724480 PCT/JP2004017234, dated Mar. 31, 2009. Japanese Notice of Grounds of Rejection, with English Translation, issued in Japanese Patent Application No. 2004-049257, dated Nov. 10, 2009.
European Office Action issued in European Patent Application No. EP 04 821 690.7 dated Apr. 15, 2010.
Japanese Office Action, w/ English translation thereof, issued in Japanese Patent Application No. JP 2004-49257 dated Oct. 19, 2010.

*Primary Examiner* — Justin Krause
(74) *Attorney, Agent, or Firm* — McDermott Will & Emery LLP (57) ABSTRACT

In a thrust needle bearing employing lubricating oil and having rollers held by a cage and rolling on races, the value of the arithmetic average roughness Ra of roller is 0.03 to 0.15 μm. Even when the bearing is used under the conditions where lubrication is lean or lubrication characteristics are wrong, the rolls can be prevented from being worn at the contact parts thereof with the pocket guide face of the cage and the life of the rollers and races can be increased.

9 Claims, 4 Drawing Sheets

FOREIGN PATENT DOCUMENTS

| | | |
|---|---|---|
| GB | 2 238 584 A | 6/1991 |
| JP | 64-79419 A | 3/1989 |
| JP | 4-357323 A | 12/1992 |
| JP | 06-173958 | 6/1994 |
| JP | 8-166014 A | 6/1996 |
| JP | 09-236130 | 9/1997 |
| JP | 2000-213546 A | 8/2000 |
| JP | 2002-250338 | 9/2002 |
| JP | 2003-83337 A | 3/2003 |
| JP | 2003-269468 A | 9/2003 |
| JP | 2003-279425 A | 10/2003 |
| JP | 2003-287035 A | 10/2003 |
| WO | WO 2004/067979 A1 | 8/2004 |

* cited by examiner

CLEARANCE BETWEEN POCKET GUIDE FACE OF CAGE AND ROLLER=a1+a2

AXIAL DEVIATION b x1 CENTRAL AXIS OF CAGE
x2 CENTRAL AXIS OF POCKET

FIG.6

BUS SHAPE OF UNUSED ROLLER
(LIMIT GAUGE)

DEPTH OF WEAR ($\mu$m)

THRUST NEEDLE BEARING

RELATED APPLICATIONS

This application is the U.S. National Phase under 35 U.S.C. §371 of International Application No. PCT/JP2004/017234, filed on Nov. 19, 2004, which in turn claims the benefit of Japanese Application No. 2004-049257, filed on Feb. 25, 2004, and Japanese Application No. 2004-049258, filed on Feb. 25, 2004 the disclosures of which Applications are incorporated by reference herein.

TECHNICAL FIELD

The present invention relates to a thrust needle bearing, and more specifically, it relates to a thrust needle bearing used under such a condition that a thrust load intermittently acts in environment of lean lubrication or inferior lubricity.

BACKGROUND ART

A thrust needle bearing, constituted of races, rollers (rolling elements) and a cage, is a bearing having various advantages such as high load capacity and high rigidity with a simple form. However, the number of the rollers is so large and internal clearances are so narrow that lubricating oil hardly spreads over rolling contact surfaces and spaces between the rollers and a pocket guide face of the cage. Further, the cage is formed by pressing a steel sheet in consideration of strength and cost in most cases. The inner surface (roller guide face) of a pocket hole formed by pressing is a shear plane having large surface roughness.

Figure 7:
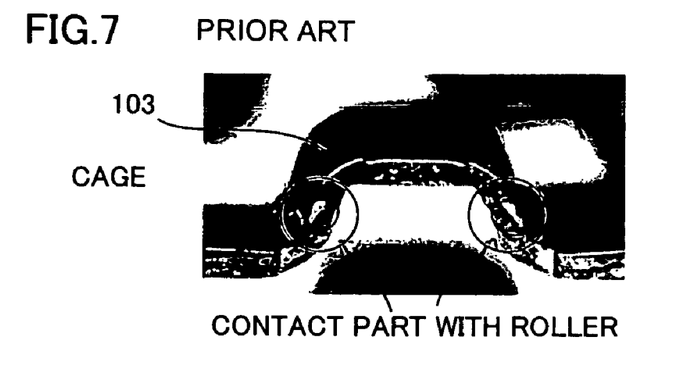
FIG. 7 illustrates parts of a cage coming into contact with a roller in a conventional thrust needle bearing.
Figure 8:
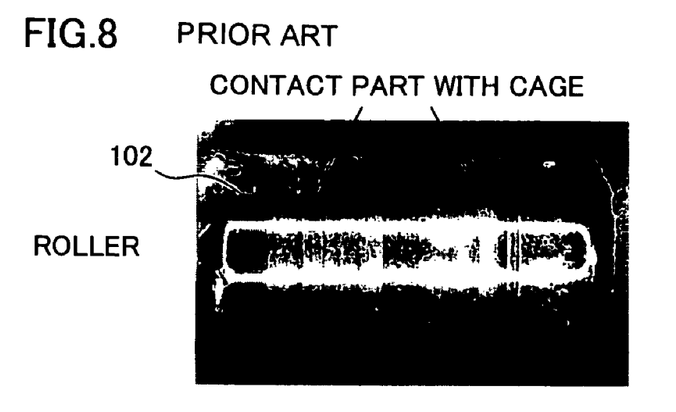
FIG. 8 illustrates parts of the roller coming into contact with the cage in the conventional thrust needle bearing.
Figure 9:
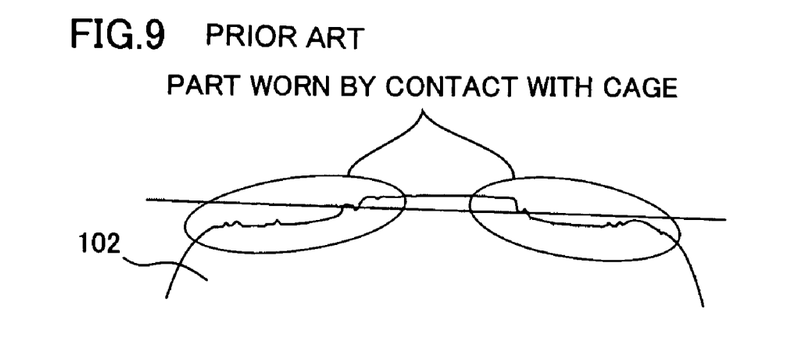
FIG. 9 illustrates worn parts of the roller shown in FIG. 8.
Figure 10:
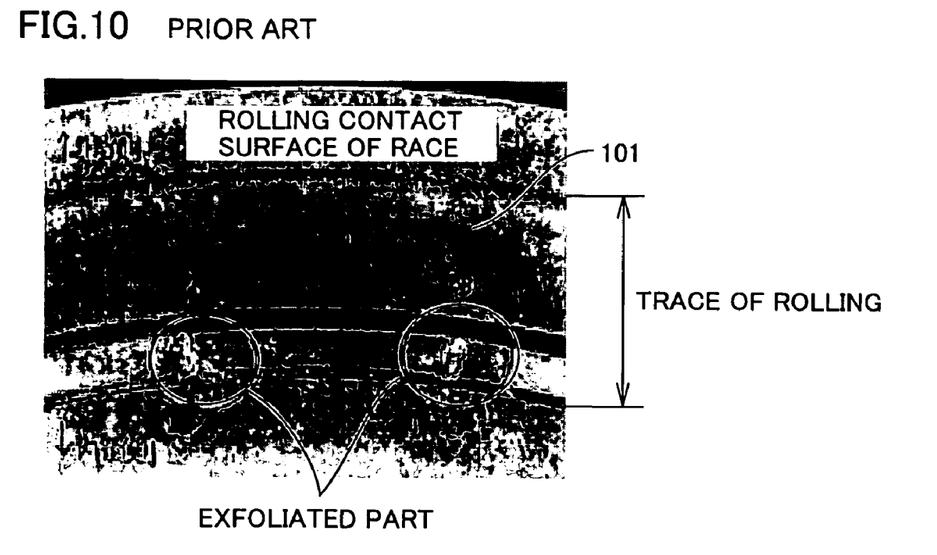
FIG. 10 illustrates exfoliated parts caused in a race in the conventional thrust needle bearing.

When the aforementioned bearing including the cage is used under a condition of lean lubrication or inferior lubricity, an oil film easily runs short between the rollers and the pocket guide face of the cage. Consequently, a roller 102 is worn on contact parts between the same and a pocket guide face of a cage 103, as shown in FIGS. 7 to 9. This wear deeply progresses on edge parts of roller 102, as shown in FIG. 9. Consequently, stress concentrates on the worn edge parts, to result in exfoliation of the roller 102 depending on load conditions. Further, surface-originating exfoliation is caused on a rolling contact surface of a race 101 coming into contact with the worn edge parts of the roller due to stress concentration and imperfect lubrication, as shown in FIG. 10.

In relation to the aforementioned problem of the roller worn on the contact parts between the same and the pocket guide face of the cage to result in exfoliation of the roller or the race and reduction of the life thereof, cages of resin (refer to Patent Document 1 and 2) are disclosed, while a cage partially made of resin at least in parts coming into contact with rollers is proposed in addition thereto (refer to Patent Document 3).

Patent Document 1: Japanese Patent Laying-Open No. 64-79419
Patent Document 2: Japanese Patent Laying-Open No. 4-357323
Patent Document 3: Japanese Patent Laying-Open No. 8-166014

DISCLOSURE OF THE INVENTION

Problems to be Solved by the Invention

Also in a cage of resin, however, rollers are worn on contact parts between the same and a pocket guide face of the cage under lean lubrication due to influence by skew of the rollers. Further, the cage is worn due to slippage on roller end faces, to result in a problem such as deviation of the positions of the rollers or breakage due to insufficient strength.

In a cage of metal partially made of resin in parts coming into contact with rollers, the resin parts are exfoliated or worn in an early stage under severer working conditions, and an effect of prolonging the life of the rollers against wear is so scarce that the rollers or races are exfoliated.

In a thrust needle bearing, the number of rollers is so large and internal clearances are so narrow that lubricating oil hardly spreads over rolling contact surfaces. Therefore, an oil film easily runs short between the rollers and a pocket guide face of a cage under a condition of lean lubrication or inferior lubricity, and the rollers are worn on contact parts between the same and the pocket guide face of the cage. In a W-type cage manufactured by pressing a steel sheet shown in FIG. 4, further, the central axis of a cage pocket deviates from the central axis of the cage by 15 to 30 µm at the maximum in consideration of working accuracy thereof. Therefore, some pocket is angled with respect to the central axis of the cage, leading to circumferential speed difference between a roller in the angled pocket and another roller in a non-angled pocket. When the cage pockets and the rollers come into contact with each other, the cage cannot be relieved but strongly comes into contact with the rollers to remarkably wear the rollers. Consequently, stress concentrates on worn edge parts of the rollers, and the rollers are exfoliated depending on load conditions. Further, surface-originating exfoliation is caused on rolling contact surfaces of races coming into contact with the worn edge parts of the rollers due to stress concentration and imperfect lubrication. It is difficult to reduce the deviation of the central axis of the cage pocket with respect to the central axis of the cage to not more than 15 µm in work accuracy thereof, and an extremely high cost is required even if the deviation can be reduced.

Means for Solving the Problems

An object of the present invention is to provide a thrust needle bearing, using a cage formed by pressing a steel sheet, unprecedentedly improved in exfoliation life with respect to a roller or a race by preventing wear of the roller on a contact part between the same and a pocket guide face of the cage also when the thrust needle bearing is used under a condition of lean lubrication or inferior lubricity.

A thrust needle bearing according to the present invention is a rolling bearing employing lubricating oil and having a rolling element held by a cage for rolling on a race, characterized in that the value of the arithmetic average roughness Ra of the rolling element is 0.03 to 0.15 µm.

In the aforementioned structure, an attack from a pocket guide face of the cage can be relaxed by setting the value of the arithmetic average roughness Ra of the rolling element to at least 0.03 µm to approach the roughness of the pocket guide face of the cage influencing wear of the rolling element. Further, an oil forming property between the pocket guide face of the cage and the rolling element can be improved by an effect of smoothing a lubricant and an adherence effect resulting from an increased surface area.

Consequently, wear of the rolling element caused by contact with the pocket guide face of the cage can be extremely reduced, and the exfoliation life with respect to the rolling element and the race can be remarkably improved. When the value of the arithmetic average roughness Ra of the roller exceeds 0.15 µm, vibration and torque of the bearing increase, to cause surface-originating exfoliation in the counter race.

According to the aforementioned structure, wear caused in the rolling element can be suppressed by reducing frictional force between the cage and the rolling element with the low-priced cage formed by pressing a low-priced steel sheet without employing a cage of resin. Therefore, the exfoliation life in the rolling element can be improved, and surface-originating exfoliation resulting from stress concentration and imperfect lubrication can be suppressed on a rolling contact surface of the race coming into contact with a worn edge part of the rolling element.

Preferably in the aforementioned thrust needle bearing, the value of the arithmetic average roughness Ra of a pocket guide face of the cage is not more than 0.4 µm.

Preferably in the aforementioned thrust needle bearing, the value of the arithmetic average roughness Ra of the race is not more than 0.5 µm.

Preferably in the aforementioned thrust needle bearing, the thrust needle bearing is used in a compressor for an air conditioner.

Preferably in the aforementioned thrust needle bearing, the thrust needle bearing is used in an automatic transmission.

Another thrust needle bearing according to the present invention is a rolling bearing employing lubricating oil and having a rolling element held by a cage for rolling on a race, characterized in that the clearance between a pocket guide face of the cage and the rolling element is 60 to 130 µm.

According to the aforementioned structure, wear caused on the rolling element can be suppressed by reducing frictional force between the cage and the rolling element with the low-priced cage formed by pressing a low-priced steel sheet without employing a cage of resin. Therefore, the exfoliation life in the rolling element can be improved, and surface-originating exfoliation resulting from stress concentration and imperfect lubrication can be suppressed on a rolling contact surface of the race coming into contact with a worn edge part of the rolling element.

If the clearance between a pocket of the cage and the rolling element is increased to at least 60 µm in the aforementioned structure, the cage is automatically controlled (the degree of freedom of the cage increases due to the large clearance) and contact with the rolling element can be relaxed also when circumferential speed difference is caused between rolling elements. In order to more reliably obtain the aforementioned automatic control mechanism, the aforementioned clearance is preferably set to at least 70 µm, and more preferably set to at least 75 µm.

Consequently, wear of the rolling element caused by contact with the pocket guide face of the cage can be extremely reduced, and the exfoliation life with respect to the rolling element and the race can be remarkably improved. If the clearance between the cage pocket and the rolling element exceeds 130 µm, not only the rolling element may fall out of the cage pocket but also wear of the rolling element increases due to warpage caused by influence by skew of the rolling element, and relative slippage between the rolling element and the race increases to cause surface-originating exfoliation in the race in a short time.

In general, there is no example setting a proper value for a clearance between a rolling element and a cage pocket in order to suppress wear of the rolling element resulting from contact between the rolling element and the cage pocket. The aforementioned clearance is obtained by adding the distances between the rolling element and ends of the pocket guide face of the cage as to both ends in plan view (the details are shown in Examples later).

Preferably in the aforementioned other thrust needle bearing, the cage is a W-type cage.

Preferably in the aforementioned other thrust needle bearing, the value of the arithmetic average roughness Ra of the rolling element to 0.03 to 0.15 µm.

Preferably in the aforementioned other thrust needle bearing, the thrust needle bearing is used in a compressor for an air conditioner.

Preferably in the aforementioned other thrust needle bearing, the thrust needle bearing is used in an automatic transmission.

DESCRIPTION OF THE REFERENCE SIGNS 1a, 1b race, 2 roller (rolling element), 3 cage, 10 thrust needle bearing, 13 cage pocket, 13b separation preventing protrusion, 13c end of pocket guide face, a1, a2 planar clearance between ends of pocket guide face and roller, x1 central axis of cage, x2 central axis of pocket, b deviation between both central axes, r bus shape of unused roller, d depth of wear.

BEST MODES FOR CARRYING OUT THE INVENTION

Examples of the present invention are now described with reference to the drawings.

First Embodiment

Figure 1:
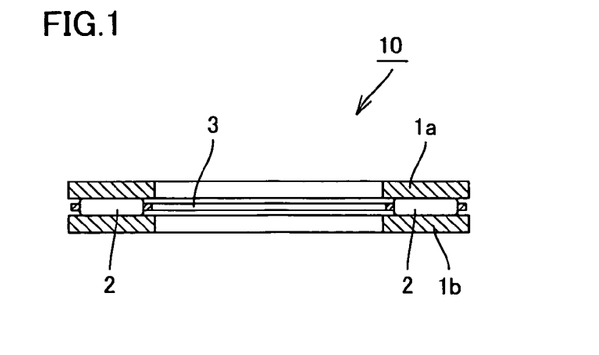
FIG. 1 illustrates a thrust needle bearing according to each embodiment of the present invention.

FIG. 1 illustrates a thrust needle bearing 10 according to a first embodiment of the present invention. Referring to FIG. 1, thrust needle bearing 10 according to this embodiment comprises races 1a and 1b, rollers (rolling elements) 2 arranged between the two races and a cage 3 guiding/holding rollers 2.

The arithmetic average roughness Ra on the surfaces of the aforementioned rollers is set to at least 0.03 µm and not more than 0.15 µm. Since the arithmetic average roughness on the surfaces of conventional rollers 2 is about at least 0.01 µm and less than 0.03 µm, an attack from a pocket guide face of the cage to the rollers can be relaxed according to the embodiment of the present invention by remarkably increasing the arithmetic average roughness as compared with the conventional value.

According to this embodiment, the following effects can be attained by setting the value of the arithmetic average roughness Ra of the aforementioned rollers (rolling elements) 2 to at least 0.03 µm and not more than 0.15 µm.

In other words, an attack from the pocket guide face of the cage influencing wear of rollers 2 can be relaxed by setting the arithmetic average roughness Ra of rollers 2 to at least 0.03 µm to approach the roughness of the pocket guide face of the cage. Further, an oil film forming property between the pocket guide face of the cage and rollers 2 is improved due to an effect of smoothing lubricating oil and an adherence effect resulting from increased surface areas. Consequently, wear caused by contact with the pocket guide face of the cage can be extremely reduced. If the arithmetic average roughness Ra of rollers 2 exceeds 0.15 µm, however, vibration and torque of the bearing increase to cause surface-originating exfoliation on counter races.

Second Embodiment

Referring to FIG. 1, a thrust needle bearing 10 according to this embodiment comprises races 1a and 1b, rollers (rolling elements) 2 arranged between the two races and a cage 3 guiding/holding rollers 2, similarly to the first embodiment.

Figure 2:
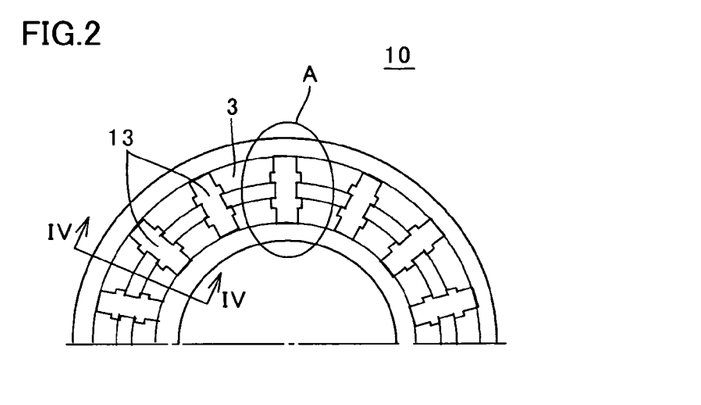
FIG. 2 is a partially fragmented plan view of the thrust needle bearing shown in FIG. 1.

FIG. 2 is a partially fragmented plan view of the upper half of thrust needle bearing 10. Referring to FIG. 2, cage 3 is provided with cage pockets 13, which are formed around a window for protruding outward so that rollers 2 come into contact with both races, for storing rollers 2.

Figure 3:
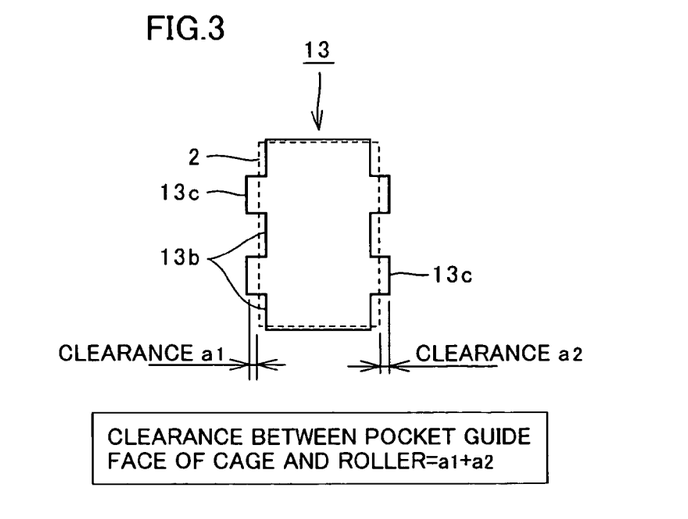
FIG. 3 is an enlarged view of a part A in FIG. 2.

FIG. 3 is an enlarged view of a part A in FIG. 2. Referring to FIG. 3, each roller 2 is cylindrical, and separation preventing protrusions 13b are formed on each cage pocket 13 from an end toward the center of the window to extend toward the inner side of roller 2 from an end of roller 2 in plan view, i.e., to overlap with roller 2 in plan view, so that roller 2 does not separate from the window. Ends of the window provided with no separation preventing protrusions 13b, i.e., ends 13c of a pocket guide face are located on positions not overlapping with roller 2 in plan view.

Figure 4:
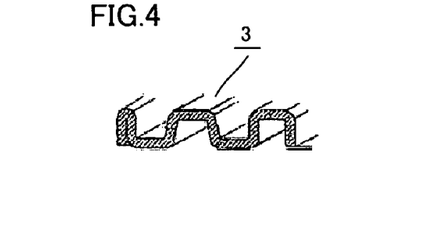
FIG. 4 is a sectional view taken along the line IV-IV in FIG. 2.

FIG. 4 shows a section of the cage taken along the line IV-IV in FIG. 2. Cage (W-type cage) 3 having a wavy shape in the radial section shown in FIG. 4, inclusive of the aforementioned window, can be formed at a low cost by pressing a steel sheet.

Referring to FIG. 3, clearances between the pocket guide face of the cage and each roller 2 show planar distances a1 and a2 between ends 13c of the pocket guide face and the outside surface of roller 2. These clearances are formed in the respective ones of two ends of the window, and hence the sum (a1+a2) of the two clearances is defined as the clearance between the pocket guide face of the cage and roller 2 in the present invention.

According to the embodiment of the present invention, the clearance (a1+a2) between the pocket guide face of the cage an the roller shown in FIG. 3 is brought into the range of at least 60 µm and not more than 130 µm. Further, the value the arithmetic average roughness Ra of roller 2 may be brought into the range of at least 0.03 µm and not more than 0.15 µm while this clearance (a1+a2) satisfies the aforementioned range. Thus, effects similar to those of the first embodiment can be attained. Consequently, a remarkable synergistic effect can be attained by satisfying both of the condition of the clearance between the aforementioned pocket guide face of the cage and roller 2 and the condition of the arithmetic average roughness of roller 2, and a thrust needle bearing remarkably improved in durability can be provided.

The upper limit of a clearance (a1+a2) between a pocket guide face of a conventional cage and a roller has been generally less than 60 µm with dispersion.

Figure 5:
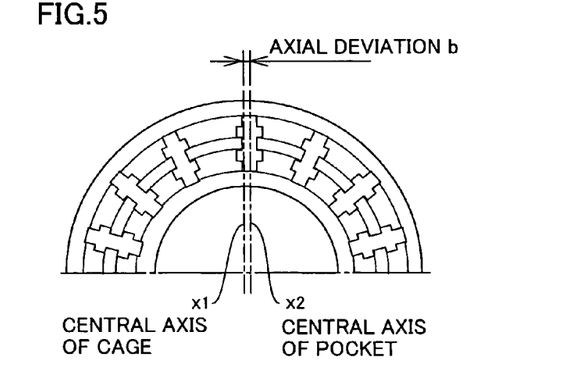
FIG. 5 is a diagram for illustrating deviation between the central axes of a cage and a pocket.

In a W-type cage manufactured by pressing a steel sheet in a thrust needle bearing, deviation b of 15 to 30 µm at the maximum is caused between the central axis x1 of a cage 3 and the central axis x2 of a cage pocket 13 in consideration of working accuracy thereof, as shown in FIG. 5. Therefore, some cage pocket 13 is angled with respect to central axis x1 of cage 3, leading to circumferential speed difference between a roller 2 in angled cage pocket 13 and another roller 2 in a non-angled cage pocket 13. When cage pocket 13 and roller 2 come into contact with each other, cage 3 cannot be relieved but strongly comes into contact with roller 2 to remarkably wear roller 2 due to this circumferential speed difference if the clearance between a pocket guide face of cage 3 and roller 2 is less than 60 µm. Stress concentrates to a worn edge part of this roller 2, to exfoliate roller 2 depending on load conditions. Further, surface-originating exfoliation is caused on a rolling contact surface of a race coming into contact with the worn edge part of the roller due to stress concentration and imperfect lubrication. It is difficult to reduce the deviation of central axis x2 of cage pocket 13 from central axis x1 of cage 3 to not more than 15 µm in consideration of working accuracy thereof, and an extremely high cost is required even if the deviation can be reduced.

When the clearance (a1+a2) between the pocket guide face of cage 3 and roller 2 is increased to at least 60 µm, cage 3 is automatically controlled (the degree of freedom of cage 3 increases due to the large clearance) despite circumferential speed difference between rollers 2, so that contact with rollers 2 can be relaxed.

In each of the aforementioned first and second embodiments, the value of the arithmetic average roughness Ra of the pocket guide face may be not more than 0.4 µm. In the structure of each of the first and second embodiments, vibration and torque of the bearing increase if the value of the arithmetic average roughness Ra of the pocket guide face of the cage exceeds 0.4 µm. In order to suppress the aforementioned vibration and torque, therefore, the value of the arithmetic average roughness Ra of the aforementioned pocket guide face of the cage is preferably not more than 0.4 µm.

In each of the aforementioned first and second embodiments, the value of the arithmetic average roughness Ra of the aforementioned races may be not more than 0.5 µm. In the structure of each of the first and second embodiments, vibration and torque of the bearing increase to entirely wear the rollers, reduce the roughness and damage the aforementioned function if the value of the arithmetic average roughness Ra of races 1a and 1b exceeds 0.5 µm.

According to the structure of each of the aforementioned first and second embodiments, wear caused on the rollers can be suppressed by reducing frictional force between the cage and the rollers with the low-priced cage formed by pressing a low-priced steel sheet without employing a cage of resin. Therefore, the exfoliation life in the rollers can be improved, and surface-originating exfoliation resulting from stress concentration and imperfect lubrication can be suppressed on rolling contact surfaces of the races coming into contact with worn edge parts of the rolling elements.

The thrust needle bearing according to each of the aforementioned first and embodiments is so used in a compressor for an air conditioner or an automatic transmission that the same can exhibit durability and ensure a long life under severe lubrication environment and an intermittently acting thrust load.

EXAMPLES

Examples of the present invention are now described.

Example 1

A roller wear test was conducted with bearings identical to the thrust needle bearing shown in FIG. 1. The roller wear test was conducted with bearings having a roller diameter of φ3 mm, a race inner diameter of φ65 mm, a case outer diameter of φ85 mm and a race thickness of 3 mm under test conditions of a load of 700 kgf, a speed of 3000 rpm and lubricating oil of spindle oil VG2 (oil film parameter λ: not more than 0.198). The roller wear test time was set to 20 hours.

A bearing life test up to breakage of the rollers or races was conducted with rollers of the same factors under test conditions of a load of 1000 kgf, a speed of 5000 rpm and lubricating oil of spindle oil VG2 (oil film parameter λ: not more than 0.0101). Bearing lives were expressed in 10% lives of eight thrust needle bearings of test bodies. Table 1 shows the results of the roller wear test and the bearing life test with various surface roughness values, and Table 2 shows the results of the wear test conducted with various surface roughness values of pocket guide faces of cages and races.

Figure 6:
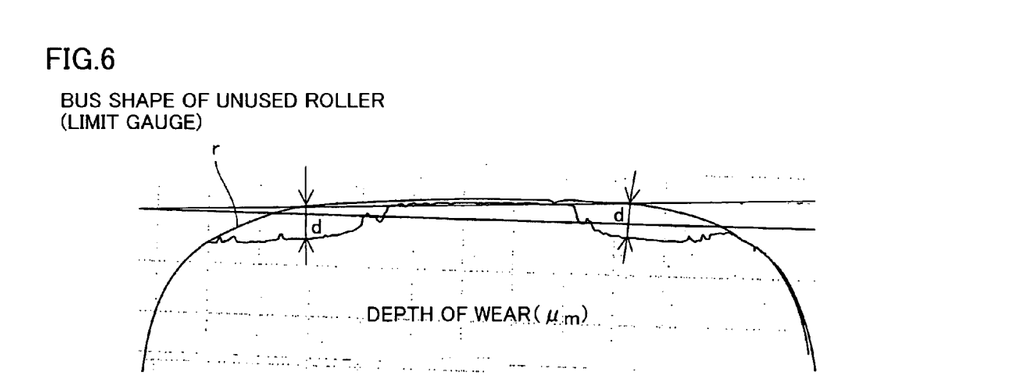
FIG. 6 illustrates the depth of wear in Example of the present invention.

The abrasion loss of each roller is expressed in a depth of wear defined in FIG. 6. With reference to a limit gauge of a bus shape r of an unused roller (measured in the axial direction of the roller), the limit gauge and the bus shape of a test roller were superposed with each other for defining the maximum difference between the surface of a rolling contact surface of the limit gauge roller and the surface of a worn part of the test roller as the depth d of wear. The depth of wear of each roller indicates the maximum depth of wear at the time of measuring all of bus shapes (axial direction) of rollers (24 rollers for each bearing) of four test bearings. It has been confirmed that wear of each test roller was caused not by relative slippage between the roller and a race but caused by contact with a cage, since the rolling contact surface of the race was not worn upon measurement the bus shape of the rolling contact surface of the race.

While the depth of wear is 3.1 μm in the rollers of a sample 1 which is a bearing using rollers having arithmetic average roughness Ra of 0.02 μm, effects of preventing wear of rollers are remarkably recognized in samples 2 to 4 integrated with rollers having arithmetic average roughness Ra of 0.04 to 0.15 μm with depths of wear of rollers of 0.1 to 1.6 μm. Also in the bearing life test, it is understood that samples 2 to 4 exhibit remarkably long lives of 8 to 19 times that of sample 1.

Current consumption of the motor increased to only about 1.2 times and friction loss did not extremely increase also when the arithmetic average roughness Ra of the rollers was more increased to 0.04 to 0.15 μm than sample 1. On the other hand, sample 5 which is a bearing using rollers having arithmetic average roughness Ra of 0.20 μm has a life of about 4 times that of sample 1, and causes surface-originating exfoliation on counter races. Further, the value of current consumption of the motor has increased to 1.5 times of sample 1, to extremely increase frictional loss.

It has been proved from the above results that wear of the rollers caused by contact between the pocket guide face of the cage and the rollers can be suppressed without increasing frictional loss by using the rollers having arithmetic average roughness Ra set to 0.04 to 0.15 μm. Consequently, it is obvious that there is an effect of improving the exfoliation life.

TABLE 1

Roller Wear Test and Bearing Life Test with Various Surface Roughness Values

| Sample No. | Surface Roughness of Roller [Ra, μm] | Roughness of Pocket Guide Face of Cage [Ra, μm] | Surface Roughness of Race [Ra, μm] | Depth of Wear of Roller [μm] | 10% Life [h] | Life Ratio | Exfoliated Part | Value of Current Consumption of Motor [A] |
|---|---|---|---|---|---|---|---|---|
| 1(Comparative Example) | 0.02 | 0.4 | 0.5 | 3.1 | 8 | 1 | Roller and Race | 3.1(1)* |
| 2(Example) | 0.04 | | | 1.6 | 61 | 8 | Roller and Race | 3.1(1) |
| 3(Example) | 0.08 | | | 1.1 | 107 | 13 | Roller | 3.6(1.2) |
| 4(Example) | 0.15 | | | 0.1 | >150 | >19 | Roller | 3.8(1.2) |
| 5(Comparative Example) | 0.20 | | | 0.5 | 31 | 4 | Race | 4.7(1.5) |

*( ) in Value of Current Consumption of Motor shows Ratio with reference to Current Value of Sample 1.

TABLE 2

Roller Wear Test and Bearing Life Test with Various Surface Roughness Values

| Sample No. | Surface Roughness of Roller [Ra, μm] | Roughness of Pocket Guide Face of Cage [μm] | Surface Roughness of Race [Ra, μm] | Depth of Wear of Roller [μm] | 10% Life [h] | Life Ratio | Exfoliated Part | Value of Current Consumption of Motor [A] |
|---|---|---|---|---|---|---|---|---|
| 4(Example) | 0.15 | 0.4 | 0.5 | 0.1 | >150 | 1 | Roller | 3.8(1.2)* |
| 6(Comparative Example) | | 0.6 | | 1.8 | 57 | <0.4 | Roller and Race | 4.3(1.4) |
| 7(Comparative Example) | | 0.4 | 0.7 | 2 | 38 | <0.3 | Roller | 4.9(1.6) |

*( ) in Value of Current Consumption of Motor shows Ratio with reference to Current Value of Sample 1.

Table 2 shows results of a roller wear test and a bearing life test conducted with cages provided with pocket guide faces having arithmetic average roughness Ra set to 0.6 μm and races having arithmetic average roughness Ra set to 0.7 μm.

From the results of the above Table 2, the depth of wear of the rollers was 0.1 μm and the life was at least 150 h. in a sample 4 prepared by setting the arithmetic average roughness Ra of the rollers to 0.15 μm, the arithmetic average roughness Ra of the pocket guide face of the cage to 0.4 μm and the arithmetic average roughness Ra of the races to 0.5 μm. In a sample 6 prepared by setting only the arithmetic average roughness Ra of the pocket guide face of the cage to 0.6 μm, however, the depth of wear of the rollers increased similarly to sample 2 in Table 1, and the life was also reduced. Further, it is understood that the value of current consumption of the motor increased to 1.4 times that of sample 1, and frictional loss extremely increased.

Also in sample 7 prepared by setting only the arithmetic average roughness Ra of the races to 0.7 μm, an effect of suppressing wear of the rollers was reduced, and frictional loss extremely increased.

From the aforementioned results, it has been proved preferable to set the arithmetic average roughness Ra of the pocket guide face of the cage to not more than 0.4 μm and to set the arithmetic average roughness Ra of the races to not more than 0.5 μm, in order to maximize the effect attained by setting the arithmetic average roughness of rolling elements to 0.03 to 0.15 μm. Referring to Table 2, Example and comparative examples are classified with reference to the aforementioned ranges of the arithmetic average roughness of the pocket guide face of the cage and the races.

Example 2

A roller wear test was conducted with thrust needle bearings identical to that shown in FIGS. 1 and 2. The roller wear test was conducted with bearings having a roller diameter of φ3 mm, a race inner diameter of φ65 mm, a case outer diameter of φ85 mm and a race thickness of φ3 mm under test conditions of a load of 700 kgf, a speed of 3000 rpm and lubricating oil of spindle oil VG2 (oil film parameter λ: not more than 0.198). The roller wear test time was set to 20 hours.

A bearing life test up to breakage of the rollers or races was conducted with rollers of the same factors under test conditions of a load of 1000 kgf, a speed of 5000 rpm and lubricating oil of spindle oil VG2 (oil film parameter λ: not more than 0.101). Bearing lives were expressed in 10% lives of eight thrust needle bearings of test bodies.

Table 3 shows the results of the roller wear test and the bearing life test conducted under the aforementioned conditions with arithmetic average roughness Ra of rollers set to 0.02 μm with various clearances between pocket guide faces of cages and rollers.

TABLE 3

Results of Roller Wear Test and Bearing Life Test with Various Clearances between Pocket Guide Face of Cage and Roller

| Sample No. | Clearance between Pocket Guide Face of Cage and Roller [μm] | Surface Roughness of Roller [Ra, μm] | Depth of Wear of Roller [μm] | 10% Life [h] | Life Ratio | Exfoliated Part |
|---|---|---|---|---|---|---|
| 11(Comparative Example) | 40 | 0.02 | 3.1 | 8 | 1 | Roller and Race |
| 12(Example) | 60 | | 1.6 | 61 | 8 | Roller and Race |
| 13(Example) | 100 | | 0.6 | 105 | 13 | Roller |
| 14(Example) | 130 | | 0.9 | 87 | 11 | Roller |
| 15(Comparative Example) | 150 | | 1.8 | 41 | 5 | Race |

The abrasion loss of each roller is expressed in a depth of wear defined as follows: With reference to a limit gauge of a bus shaper of an unused roller (measured in the axial direction of the roller), the limit gauge and the bus shape of a test roller were superposed with each other for defining the maximum difference between the surface of a rolling contact surface of the limit gauge roller and the surface of a worn part of the test roller as the depth d of wear. The depth d of wear of each roller indicates the maximum depth of wear at the time of measuring all of bus shapes (axial direction) of rollers (24 rollers for each bearing) of four test bearings. It has been confirmed that wear of each test roller was caused not by relative slippage between the roller and a race but caused by contact with a cage, since the rolling contact surface of the race was not worn upon measurement the bus shape of the rolling contact surface of the race.

From the results of the above Table 3, the depth of wear of rollers is 3.1 μm in a sample 11 which is a bearing having clearances of 40 μm between a pocket guide face of a cage and the rollers, while roller wear preventing effects are remarkably recognized in samples 12 to 14 having clearances of 60 to 130 μm with depths of wear of rollers of 1.6 to 0.6 μm. Also in the bearing life test, it is understood that samples 12 to 14 exhibit remarkably long lives of 8 to 13 times that of sample 11.

On the other hand, the rollers fall out of the cage in a sample 15 which is a bearing having clearances of 130 μm. When a test was conducted by setting the rollers on the cage with a holder, sample 15 caused surface-originating exfoliation in counter races although this sample exhibited a life of about 5 times that of sample 11.

It has been clarified from the above results that wear of the rollers resulting from contact between the pocket guide face of the cage and the rollers is suppressed for improving the exfoliation life by setting the aforementioned clearances in the range of 60 to 130 μm.

Table 4 shows results of a wear test and a bearing life test conducted by setting clearances exhibiting most excellent wear and life of rollers to a constant value of 100 μm and varying surface roughness Ra of the rollers in the range of 0.02 to 0.20 μm.

TABLE 4

Results of Roller Wear Test and Bearing Life Test with Various Surface Roughness Values

| Sample No. | Surface Roughness of Roller [Ra, μm] | Clearance between Pocket Guide Face of Cage and Roller [μm] | Depth of Wear of Roller [μm] | 10% Life [h] | Life Ratio | Exfoliated Part | Value of Current Consumption of Motor [A] |
|---|---|---|---|---|---|---|---|
| 21(Comparative Example) | 0.02 | 100 | 0.8 | 105 | 13[*1] | Roller and Race | 3.1(1)[*2] |
| 26(Example) | 0.04 | | 0.5 | 121 | 15 | Roller and Race | 3.1(1) |
| 27(Example) | 0.15 | | 0.1 | >160 | >20 | Roller | 4.1(1.2) |
| 28(Comparative Example) | 0.20 | | 0.1 | 41 | 5 | Race | 4.8(1.5) |

[*1]Life Ratio shows Ratio with reference to Life of Sample 1.
[*2]( ) in Value of Current Consumption of Motor shows Ratio with reference to Current Value of Sample 1.

From the results of the above Table 4, the depth of wear of rollers was 0.8 μm and the life was at least 105 h. in a sample 21 prepared by setting the surface roughness Ra of the rollers to 0.02 μm, while the depths of wear of rollers were clearly reduced and the lives were also improved in samples 26 and 27 having surface roughness values Ra of the rollers of 0.04 μm and 0.15 μm respectively. In particular, sample 27 having the surface roughness Ra of rollers of 0.15 μm exhibited a life of at least 20 times that of sample 11. On the other hand, a sample 28 having surface roughness Ra of rollers of 0.20 μm exhibited a life of about 5 times as compared with sample 11. However, this sample caused surface-originating exfoliation in counter races. Further, it is understood that the value of current consumption of a motor increased to 1.5 times that of sample 11, and frictional loss extremely increased.

It has been proved from the aforementioned results that remarkably excellent wear resistance and surface-originating exfoliation resistance can be obtained by setting the clearances between the cage guide face and the rollers to 60 to 130 μm and setting the surface roughness Ra of the rollers to 0.03 to 0.15 μm. Consequently, it has been made possible to provide a thrust needle bearing unprecedentedly excellent in wear resistance of rollers.

While embodiments and Examples of the present invention have been described in the above, the embodiments and Examples of the present invention disclosed in the above are illustrations to the utmost, and the scope of the present invention is not restricted to these embodiments and Examples of the present invention. The scope of the present invention is shown by the description of the scope of claim for patent, and includes all modifications within the meaning and range equivalent to the description of the scope of claim for patent.

INDUSTRIAL APPLICABILITY

It is possible to remarkably reduce wear of rolling elements in lean lubrication environment and under an intermittent thrust load condition for implementing a long life by employing the thrust needle bearing according to the present invention and forming a cage with steel allowing a low-priced material and a low-priced manufacturing process, whereby the present invention is expected to be widely utilized for a compressor for a car air conditioner or an automatic transmission.

The invention claimed is:

1. A thrust needle bearing employing lubricating oil and having a rolling element held by a cage and rolling on a race, wherein
   the cage has a cage pocket, in which the rolling element is stored to come in contact with a pocket guide face thereof constituted by a shear plane formed through pressing for the cage pocket,
   the clearance between the pocket guide face of said cage and said rolling element is set to at least 60 μm and at most 130 μm,
   the value of the arithmetic average roughness Ra of said rolling element coming into contact with the shear plane is set to at least 0.08 μm and at most 0.15 μm, and
   a ratio of the value of the arithmetic average roughness Ra of the rolling element to the value of the arithmetic average roughness Ra of the pocket guide face is set to 0.2 to 0.375.

2. The thrust needle bearing according to claim 1, wherein the value of the arithmetic average roughness Ra of a pocket guide face of said cage is set to at most 0.4 μm.

3. The thrust needle bearing according to claim 1, wherein the value of the arithmetic average roughness Ra of said race is set to at most 0.5 μm.

4. The thrust needle bearing according to claim 1, used in a compressor for an air conditioner.

5. The thrust needle bearing according to claim 1, used in an automatic transmission.

6. A thrust needle bearing employing lubricating oil and having a rolling element held by a cage and rolling on a race, wherein
   the cage has a cage pocket, in which the rolling element is stored to come in contact with a pocket guide face thereof constituted by a shear plane formed through pressing for the cage pocket,
   the clearance between the pocket guide face of said cage and said rolling element is set to at least 60 μm and at most 130 μm, and
   a ratio of the value of the arithmetic average roughness Ra of the rolling element to the value of the arithmetic average roughness Ra of the pocket guide face is set to 0.2 to 0.375.

7. The thrust needle bearing according to claim 6, wherein said cage has a radial section with a shape of a square wave rising and falling in the form of a square between a first level and a second level different from each other in height,
   said cage has portion of said first level at a location corresponding to a radial central portion of said rolling element, and said portion of said first level has a first convex portion which can be contacted with a circumferential surface of said radial central portion of said rolling element, and said cage has portions of said second level at locations respectively corresponding to an inner circumferential side and an outer circumferential side of said radial central portion of said rolling element, and said portions of said second level have second convex portions which can be respectively contacted with end surfaces of the inner circumferential side and the outer circumferential side of said rolling element.

8. The thrust needle bearing according to claim 6, used in a compressor for an air conditioner.

9. The thrust needle bearing according to claim 6, used in an automatic transmission.

* * * * *